(12) United States Patent
Bombal

(10) Patent No.: US 7,203,803 B2
(45) Date of Patent: Apr. 10, 2007

(54) OVERFLOW PROTECTED FIRST-IN FIRST-OUT ARCHITECTURE

(75) Inventor: Jerome Bombal, LaTrinite (FR)

(73) Assignee: Texas Instruments Incorporated, Dallas, TX (US)

( * ) Notice: Subject to any disclaimer, the term of this patent is extended or adjusted under 35 U.S.C. 154(b) by 306 days.

(21) Appl. No.: 10/773,482

(22) Filed: Feb. 6, 2004

(65) Prior Publication Data

US 2005/0033907 A1   Feb. 10, 2005

(30) Foreign Application Priority Data

Aug. 7, 2003   (EP) ................................. 03291984

(51) Int. Cl.
*G06F 12/02*   (2006.01)
(52) U.S. Cl. ...................... 711/157; 710/57; 711/154
(58) Field of Classification Search ..................... None
See application file for complete search history.

(56) References Cited

U.S. PATENT DOCUMENTS

| | | | | |
|---|---|---|---|---|
| 5,521,876 | A * | 5/1996 | Hattori et al. | ............... 365/221 |
| 5,974,516 | A * | 10/1999 | Qureshi | ....................... 711/171 |
| 6,044,419 | A | 3/2000 | Hayek et al. | |
| 6,556,495 | B2 * | 4/2003 | Condorelli et al. | ......... 365/221 |

OTHER PUBLICATIONS

"End-to-End Performance Models For Variable Bit Rate Voice Over Tandem Links In Packet Networks", S. Dravida & K. Sriram, Infocom '89. Proceedings of the Eighth Annual Joint Conference of the IEEE Computer and Communications Societies. Technology: Emerging or Converging, IEEE Ottawa, Ont., Canada Apr. 23-27, 1989, Washington, DC USA, IEEE Computer Soc. PR, US, pp. 1089-1097, XP010015471, ISBN: 0-8186-1920-1.

* cited by examiner

*Primary Examiner*—B. James Peikari
(74) *Attorney, Agent, or Firm*—Steven A. Shaw; W. James Brady; Frederick J. Telecky, Jr.

(57) ABSTRACT

An electronic device (10). The device comprises an input ($16_I$) for receiving successive data words, wherein each data word of the successive data words comprises a plurality of bits. The device also comprises a memory structure (12) comprising a plurality of memory word addresses, wherein each memory word address corresponds to a storage structure operable to store a data word having the plurality of bits. The device also comprises control circuitry (14, 16), operable during a non-overflow condition of the memory structure, for writing successive ones of received data words into respective successive ones of the memory word addresses. Finally, the device also comprises control circuitry (14, 16), operable during an overflow condition of the memory structure, for writing each data word in successive ones of received data words across multiple ones of the memory word addresses.

20 Claims, 11 Drawing Sheets

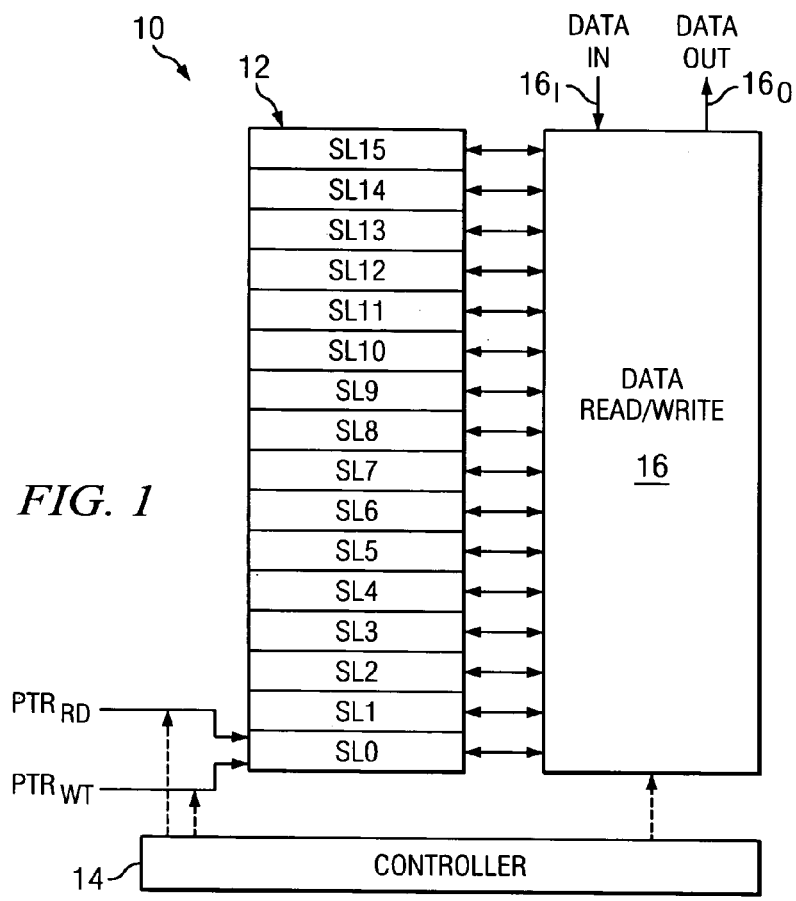
FIG. 1
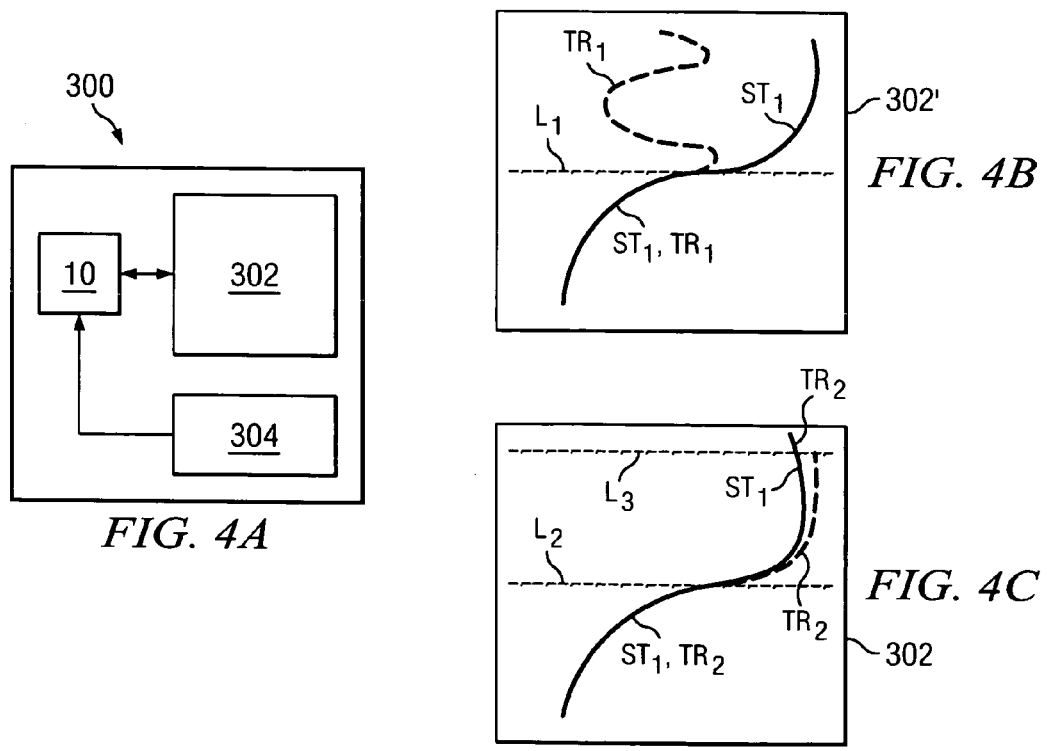
FIG. 4A
FIG. 4B
FIG. 4C

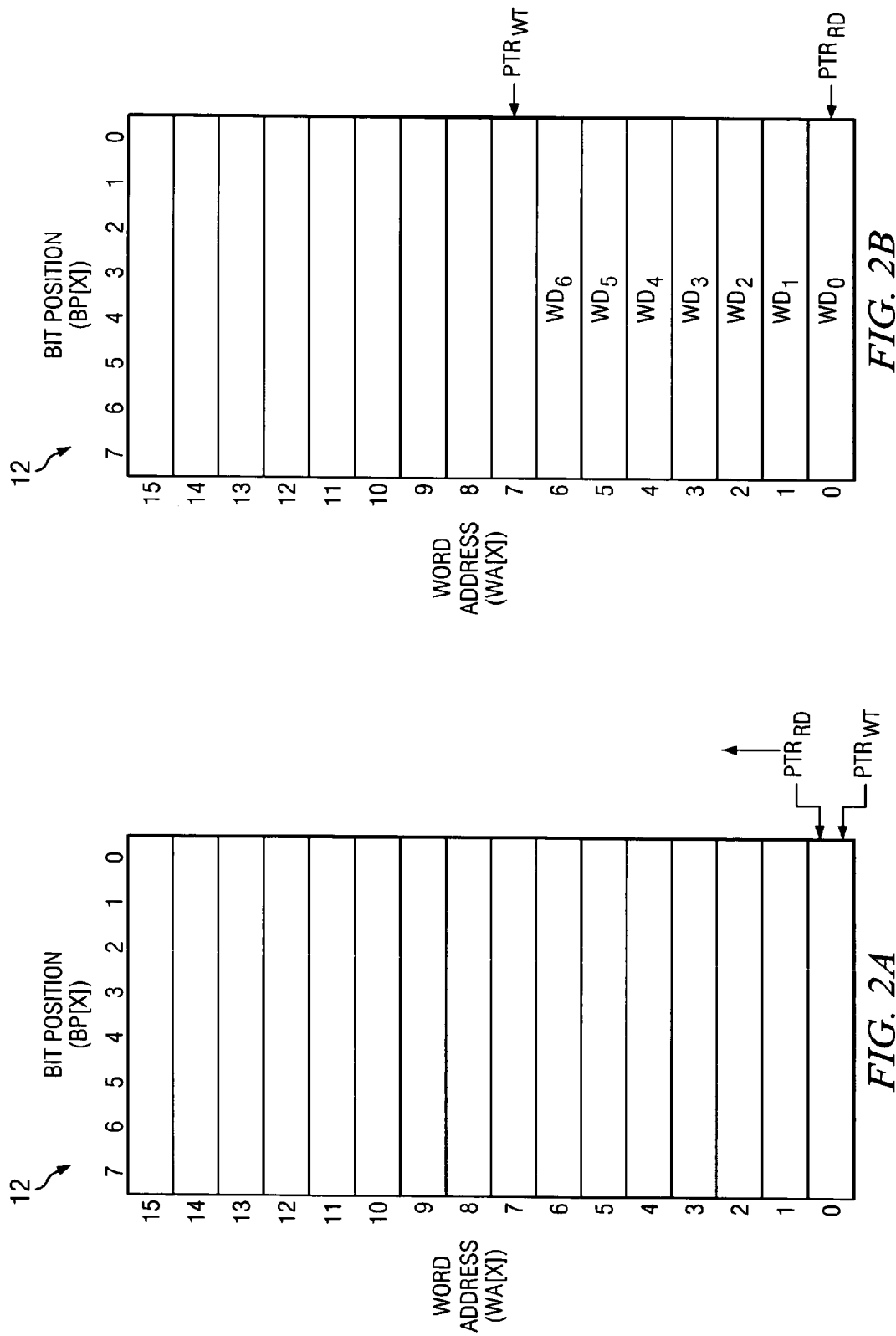

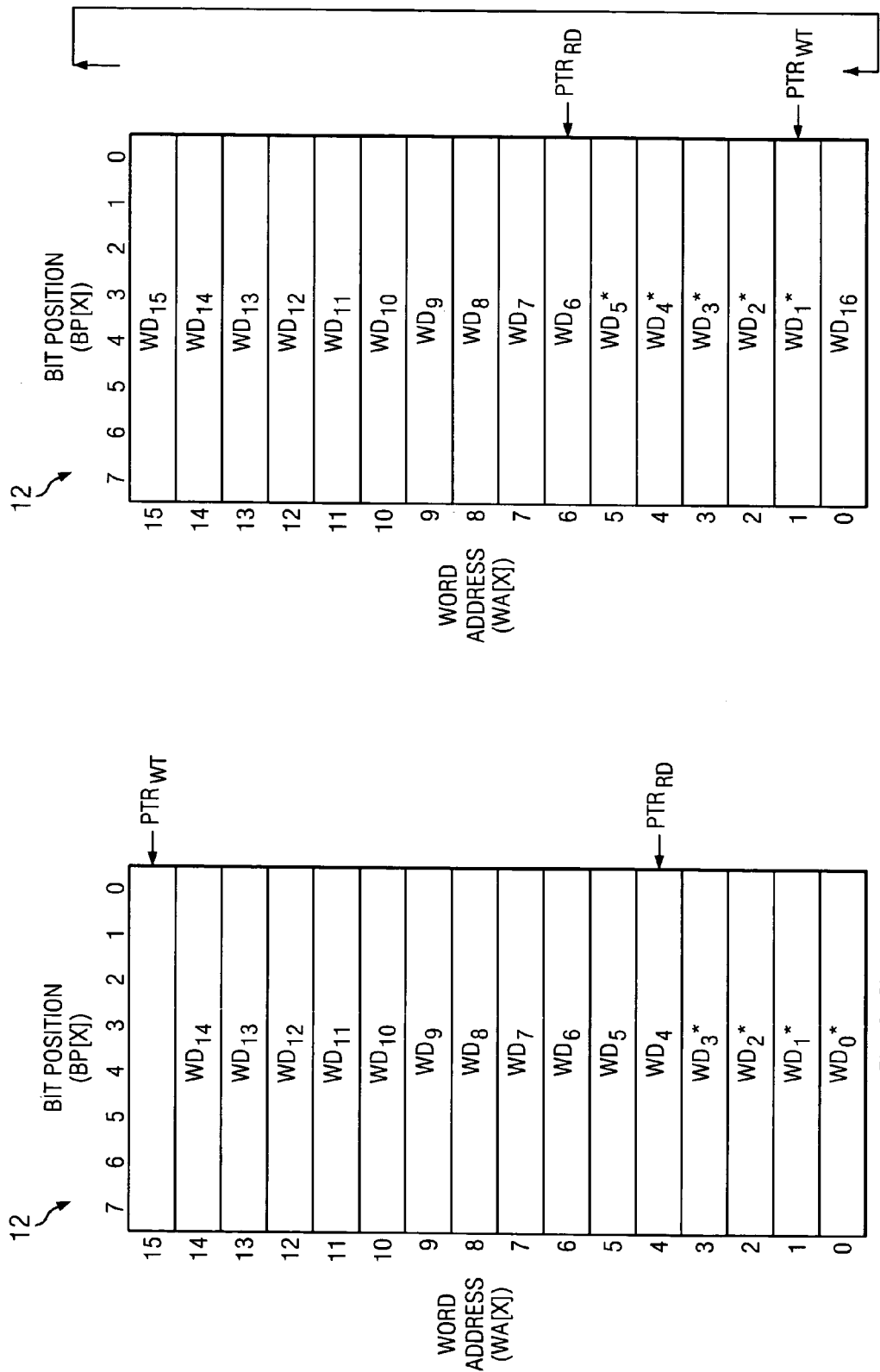

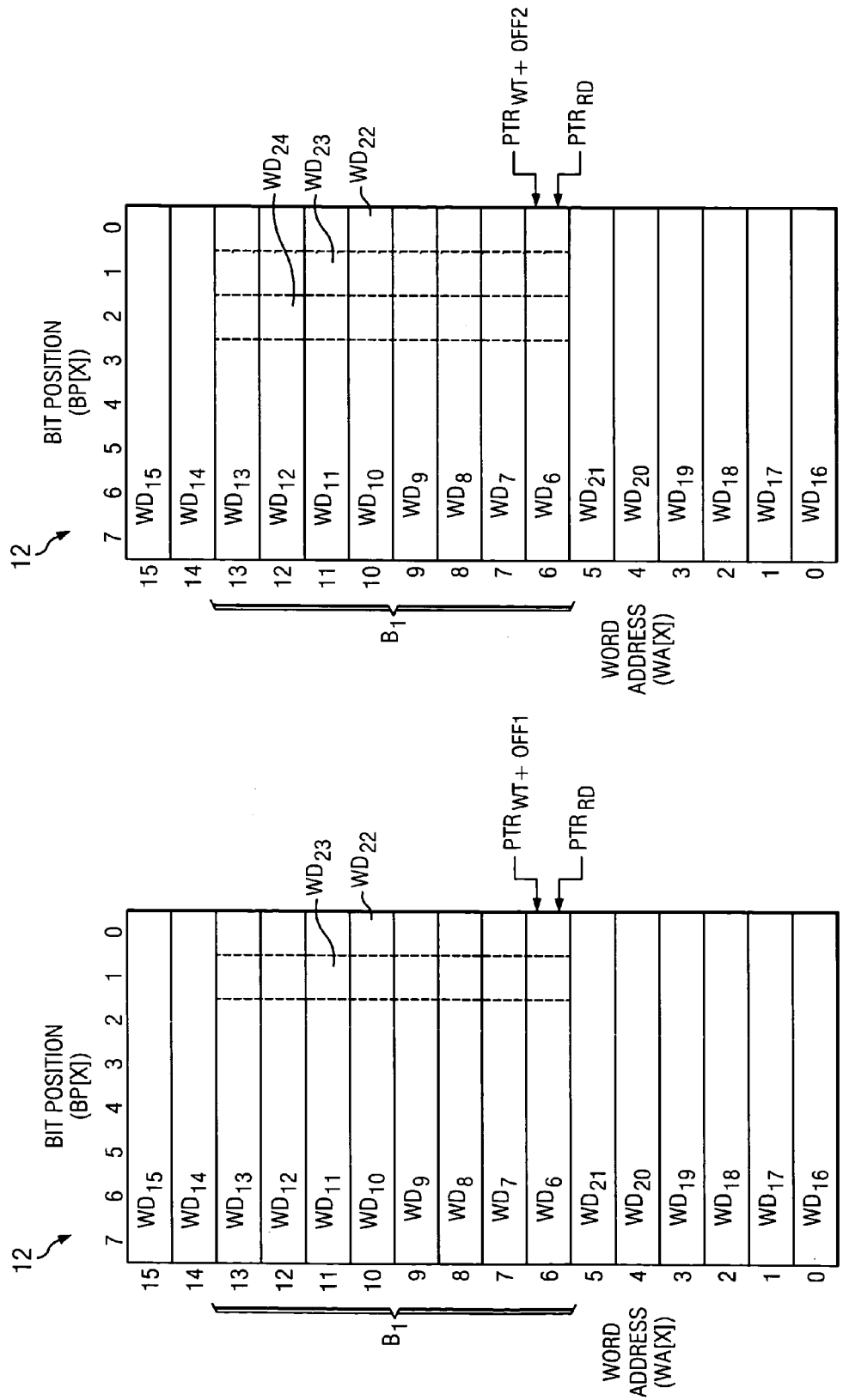

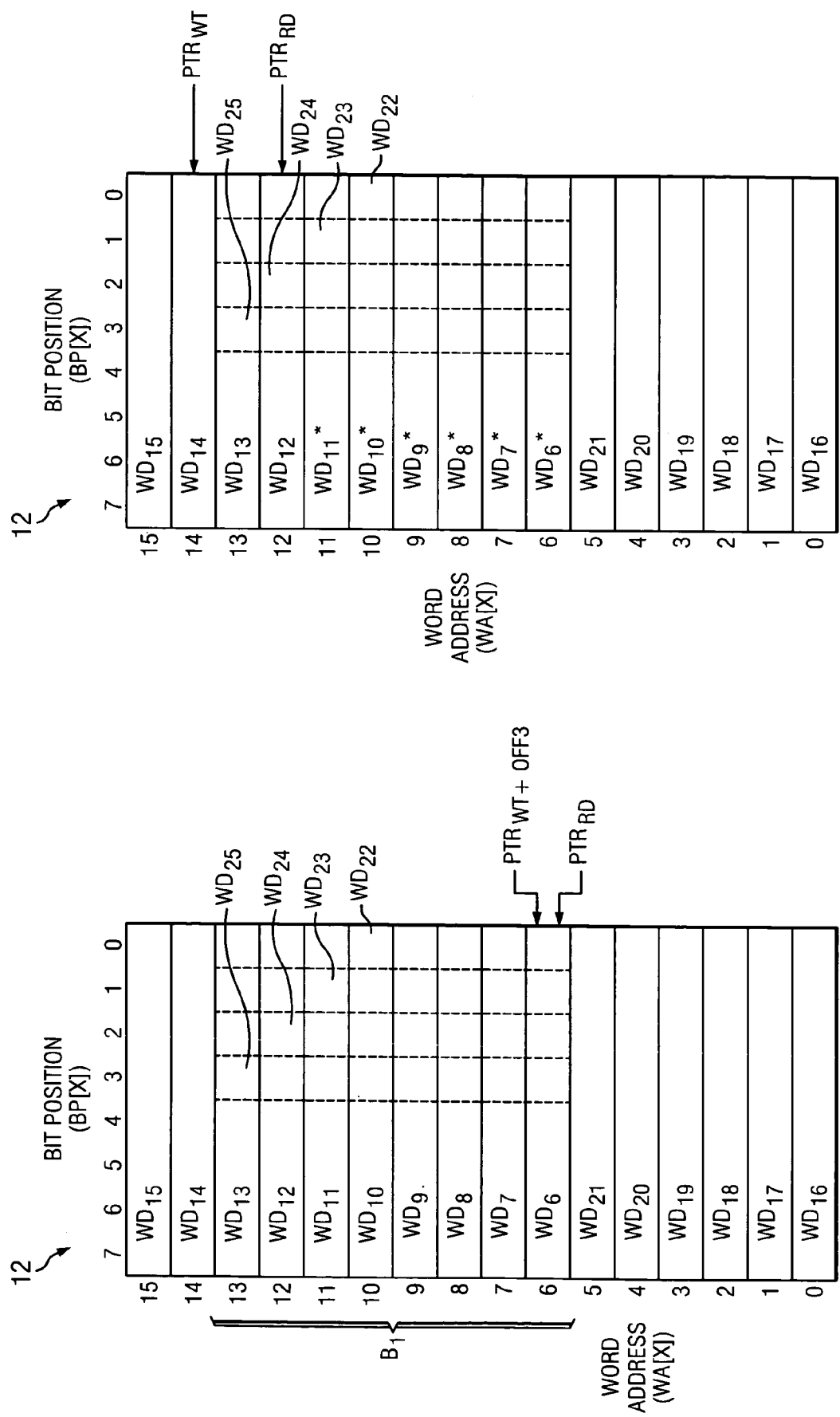

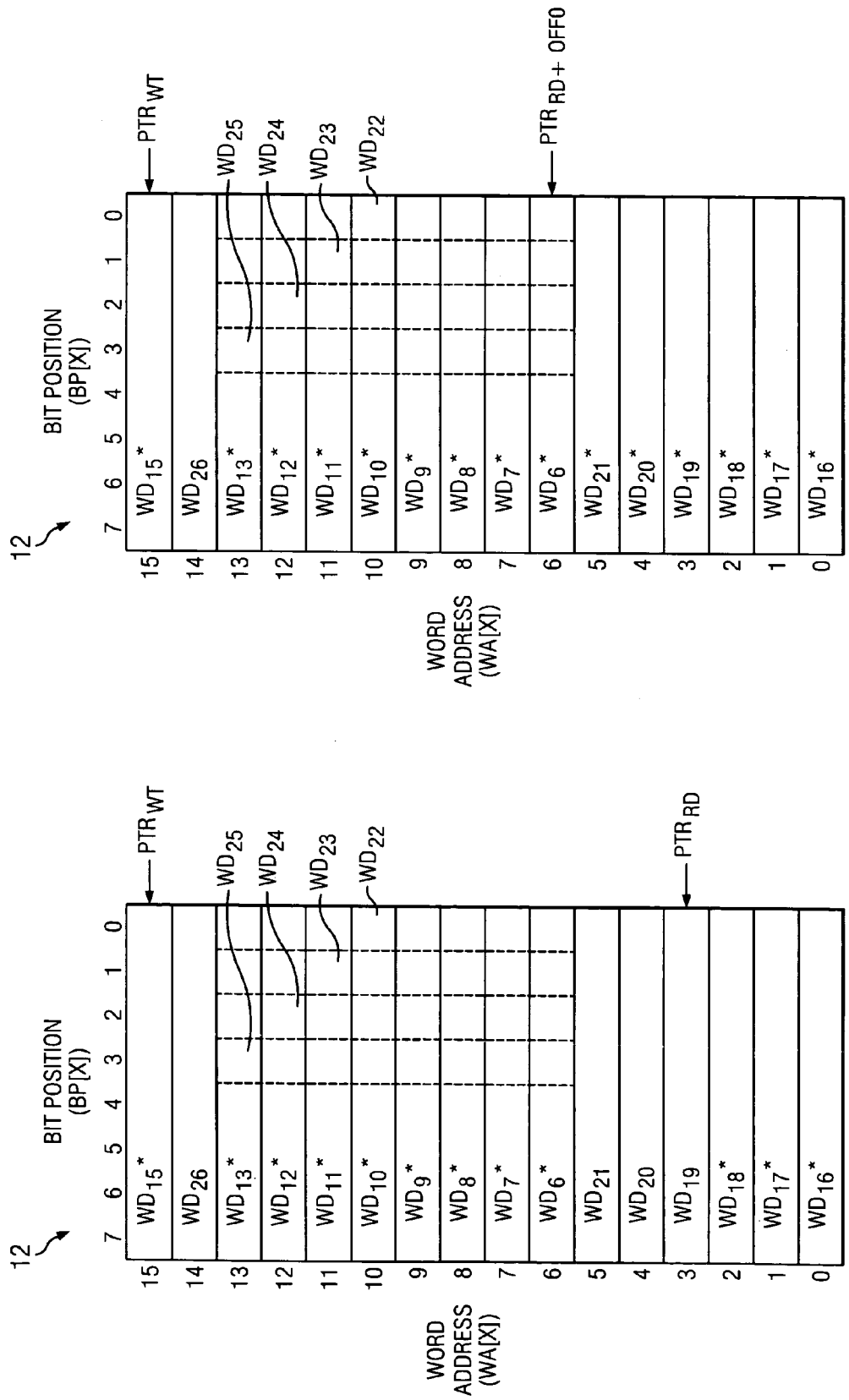

OVERFLOW PROTECTED FIRST-IN FIRST-OUT ARCHITECTURE

This application claims priority under 35 USC §(e)(1) of European Application Number 03291984.7 filed Aug. 7, 2003.

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to electronic devices and circuits and are more particularly directed to such devices and circuits that include a first-in first-out ("FIFO") circuit with overflow protection.

Electronic circuits have become prevalent in numerous applications, including uses for devices in personal, business, and other environments. Demands of the marketplace affect many aspects of the design of these circuits, including factors such as device complexity, size, and cost. Various of these electronic circuits include some aspect of digital signal processing and, quite often, these circuits include storage devices that operate on a FIFO basis. As is well-known in the art, such FIFO circuits are so named because data words are read from the circuit in the same order as they were written to the circuit. Word size of the FIFO depends on the application and may be any number of bits, where 4 bits, 8 bits, 16 bits, and 32 bits are common examples, while any number of bits per word may be implemented based on the application. The number of words in a given FIFO also is typically dictated at least in part by the application.

Given that a FIFO storage circuit has a limited storage size, provisions have been made in the prior art in case of an overflow condition in the FIFO. Such an overflow occurs when a data word is received or otherwise scheduled to be written into the FIFO, yet the writing of that word would overwrite valid data in the FIFO that has not yet been read. In other words, were such a word written into the FIFIO, it would overwrite and thereby destroy valid data. In the prior art, when such a potential overflow is detected, then some type of intervention has been employed. A common response is to prevent the write, which would otherwise overwrite valid unread data, while also generating an interrupt to some type of controller or other responsive circuit. In this way, the responsive circuit can deny the receipt of any additional words while also holding the FIFO write in abeyance until a read from the FIFO occurs, thereby freeing a word slot in the FIFO to receive the pending write. Alternatively, the interrupt may require a more intrusive response by the device, such as a system reset. Without these types of intervention, valid data in the FIFO can be overwritten and thereby provide erroneous results that are derived from the newer data as opposed to the older yet valid data that was overwritten.

In addition to the interrupt-type response described above, another approach made in the prior art to minimize FIFO overflow conditions is through the design sizing of the FIFO. For example, one approach is to determine the maximum number of words that will require storage in the FIFO for some large percentage of the time, such as 95 percent of the time. For example, assume a design implementation where it is anticipated that a FIFO will require storage of no more than 32 words over 95 percent of the time. Then, to finalize the actual implemented size of the FIFO, the maximum number is doubled to define the actual number of words that can be accommodated by the FIFO. Thus, continuing the example of 32 words, that number is doubled so that the FIFO is constructed to store up to 64 words. In this manner, for that 5 percent of the time not contemplated in the preceding, it is assumed that no more than the doubled value, 64 words, will be required to be stored in the FIFO. Thus, if during the 5 percent of the time up to 64 words require storage, the FIFO is still sufficiently large so as to provide storage for those words. However, if that upper limit (e.g., 64 words) is sought to be exceeded by a write at any given time, then a response such as the above-described interrupt process may also be implemented in connection with the FIFO.

While the above-described approaches have proven workable in various implementations, the present inventor has observed that the prior art may include various drawbacks. For example, in the prior art approach of doubling the FIFO space, an inefficiency is necessarily provided in that, for potentially a majority of the time, up to one-half of the FIFO will remain unwritten with valid data. This unoccupied space corresponds to increased area used in a circuit such as an integrated circuit. Additionally, there may be increased power consumption or considerations with respect to this enlarged FIFO. As yet another and often key consideration, doubling of the FIFO space increases device cost, which is commonly a restrictive drawback in the commercial marketplace. As another example, a smaller FIFO that is forced to often reset or interrupt due to repeated overflow conditions may be too restrictive for various applications. Thus, the preferred embodiments as set forth below seek to improve upon the prior art as well as these associated drawbacks.

BRIEF SUMMARY OF THE INVENTION

In the preferred embodiment, there is an electronic device. The device comprises an input for receiving successive data words, wherein each data word of the successive data words comprises a plurality of bits. The device also comprises a memory structure comprising a plurality of memory word addresses, wherein each memory word address corresponds to a storage structure operable to store a data word having the plurality of bits. The device also comprises control circuitry, operable during a non-overflow condition of the memory structure, for writing successive ones of received data words into respective successive ones of the memory word addresses. Finally, the device also comprises control circuitry, operable during an overflow condition of the memory structure, for writing each data word in successive ones of received data words across multiple ones of the memory word addresses.

Other aspects are also disclosed and claimed.

BRIEF DESCRIPTION OF THE SEVERAL VIEWS OF THE DRAWING

FIG. 1 illustrates a block diagram of a data storage system designated generally at 10 and according to the preferred embodiments.

FIG. 2A illustrates an example of the beginning of a sequence of operations with respect to FIFO 12 of FIG. 1, where FIG. 2A illustrates FIFO 12 prior to the writing of data to, or reading of data from, FIFO 12.

FIG. 2B illustrates FIFO 12 of FIG. 2A after the writing of seven data words into the FIFO.

FIG. 2C illustrates FIFO 12 of FIG. 2B after the writing of eight additional data words into the FIFO and the reading of four data words from the FIFO.

FIG. 2D illustrates FIFO 12 of FIG. 2C after the writing of two additional data words into the FIFO and the reading of two additional data words from the FIFO.

FIG. 2G illustrates FIFO 12 of FIG. 2F after the writing of a second data word into the FIFO during its overflow condition, where the second data word is written across multiple word addresses.

FIG. 2H illustrates FIFO 12 of FIG. 2G after the writing of a third data word into the FIFO during its overflow condition, where the third data word is written across multiple word addresses.

FIG. 2I illustrates FIFO 12 of FIG. 2H after the writing of a fourth data word into the FIFO during its overflow condition, where the fourth data word is written across multiple word addresses.

FIG. 2J illustrates FIFO 12 of FIG. 2I after the reading of six additional data words from the FIFO during its overflow condition, where the read words are those stored during a non-overflow condition.

FIG. 2K illustrates FIFO 12 of FIG. 2J after the writing of one word into the FIFO in a non-overflow condition and the reading of seven additional data words from the FIFO, where the read words are those stored during a non-overflow condition.

FIG. 2L illustrates FIFO 12 of FIG. 2K after the reading of three additional data words from the FIFO, where the read words are those stored during a non-overflow condition.

FIG. 4A illustrates a preferred embodiment palm held device incorporating system 10.

FIG. 4B illustrates a screen trace on a device comparable to that of FIG. 4A but implementing a prior art FIFO system.

FIG. 4C illustrates a screen trace on the device of FIG. 4A according to the preferred embodiment.

DETAILED DESCRIPTION OF THE INVENTION

Figures 2E, 2F:
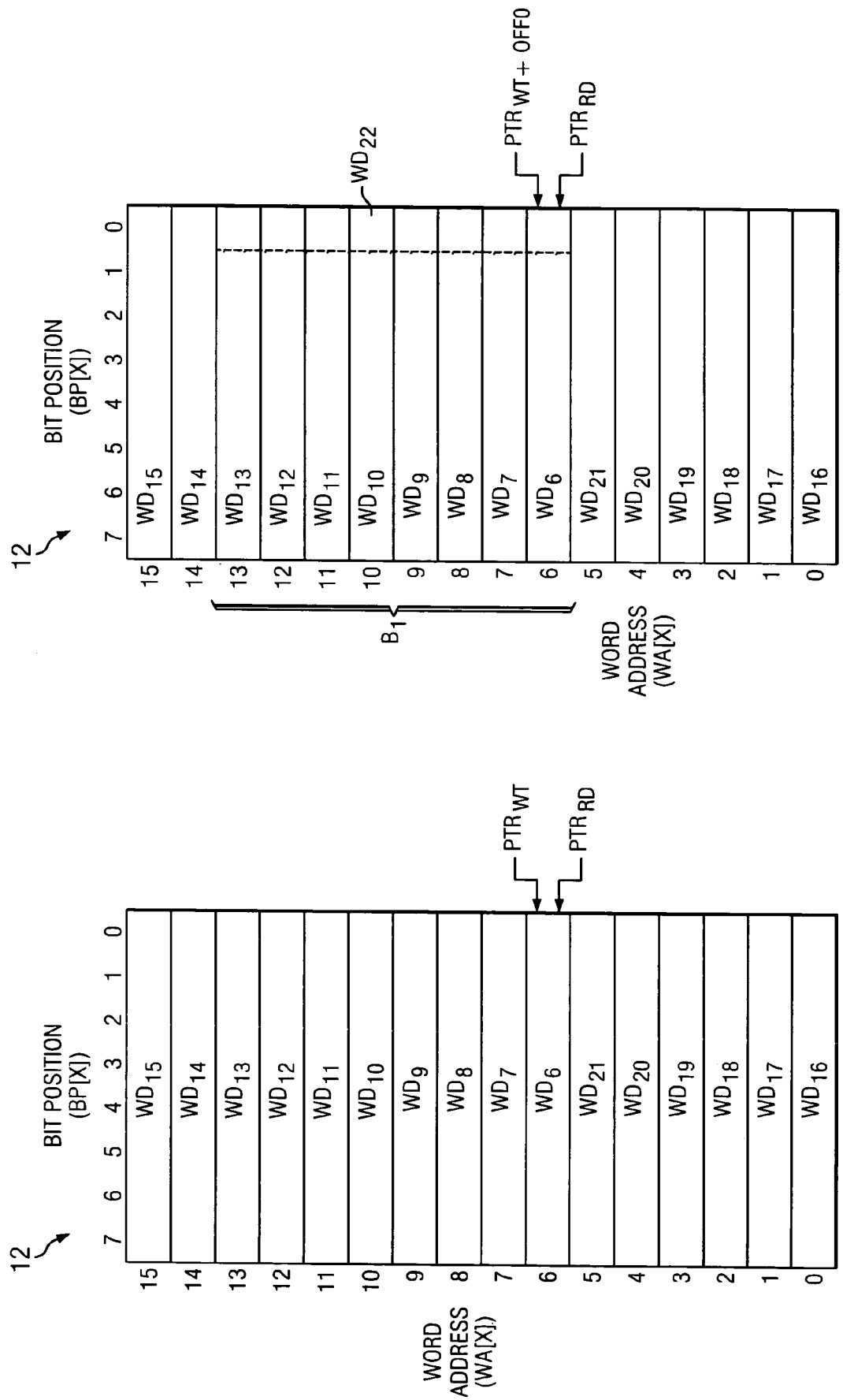
FIG. 2E illustrates FIFO 12 of FIG. 2D after the writing of five additional data words into the FIFO, wherein an overflow condition occurs if the next operation is to be a write into the FIFO.
FIG. 2F illustrates FIFO 12 of FIG. 2E after the writing of a first data word into the FIFO during its overflow condition, where the first data word is written across multiple word addresses.

FIG. 1 illustrates a block diagram of a data storage system designated generally at 10 according to the preferred embodiments. In one preferred embodiment, system 10 is constructed using a singe integrated circuit and, indeed, additional circuitry is likely included within such an integrated circuit. However, to simplify the present illustration and discussion, such additional circuitry is neither shown nor described. Moreover, system 10 may be implemented in connection with numerous digital data systems, where one preferred implementation is detailed later in connection with FIG. 4A.

Looking to the blocks in system 10, system 10 includes various items which in general are known in the prior art, but additional control and operation as detailed later distinguishes the overall system. Looking by way of introduction to some of the blocks that are comparable to the prior art, they include a FIFO 12 having a number of word storage slots; by way of example, 16 such slots are shown and designated SL0 through SL15. However, the choice of 16 is only by way of illustration and one skilled in the art will recognize that the inventive teachings of this document may be implemented in different sized FIFO devices. In the preferred embodiment, each storage slot SLx has a same bit dimension, where that dimension may be any size. For the sake of example in this document, assume that this dimension is 8 bits, that is, each storage slot is operable to store an 8-bit word. Also included in system 10 are a write pointer $PTR_{WT}$ and a read pointer $PTR_{RD}$. In general, write pointer $PTR_{WT}$ indicates the word slot into which a next word will be written into FIFO 12. Conversely, read pointer $PTR_{RD}$ indicates the word slot from which a next word will be read from FIFO 12. The implementation of, and indication of the respective words by, pointers $PTR_{WT}$ and $PTR_{RD}$, may be achieved in various fashions ascertainable by one skilled in the art and consistent with the functionality described in this document.

Turning now to aspects of system 10 as part of the overall inventive structure, system 10 includes a controller 14 coupled to both write pointer $PTR_{WT}$ and read pointer $PTR_{RD}$. In one sense, controller 14 communicates with these two pointers to increment each pointer as individual read and write operations occur into single respective storage slots, but as detailed later controller 14 also operates in connection with these pointers to read and write data in an inventive manner in connection with an overflow event. Also in regard to both overflow and non-overflow conditions, controller 14 is connected to a data read/write circuit 16 that is bi-directionally connected to each storage slot in FIFO 12. Thus, data to be written to FIFO 12 is provided to an input $16_I$ of data read/write circuit 16, and data when read out of FIFO 12 is provided at output $16_O$ of data read/write circuit 16. Lastly, while not shown, controller 14 maintains overflow offsets OFF0, OFF1, OFF2, and OFF3. In general, these offsets are used to identify a write location in FIFO 12 in response to an overflow condition in FIFO 12, as further detailed later. From that discussion, it will be readily understood that each of controller 14, read/write circuit 16, and the overflow offsets may be implemented in various fashions ascertainable by one skilled in the art.

Figure 2M:
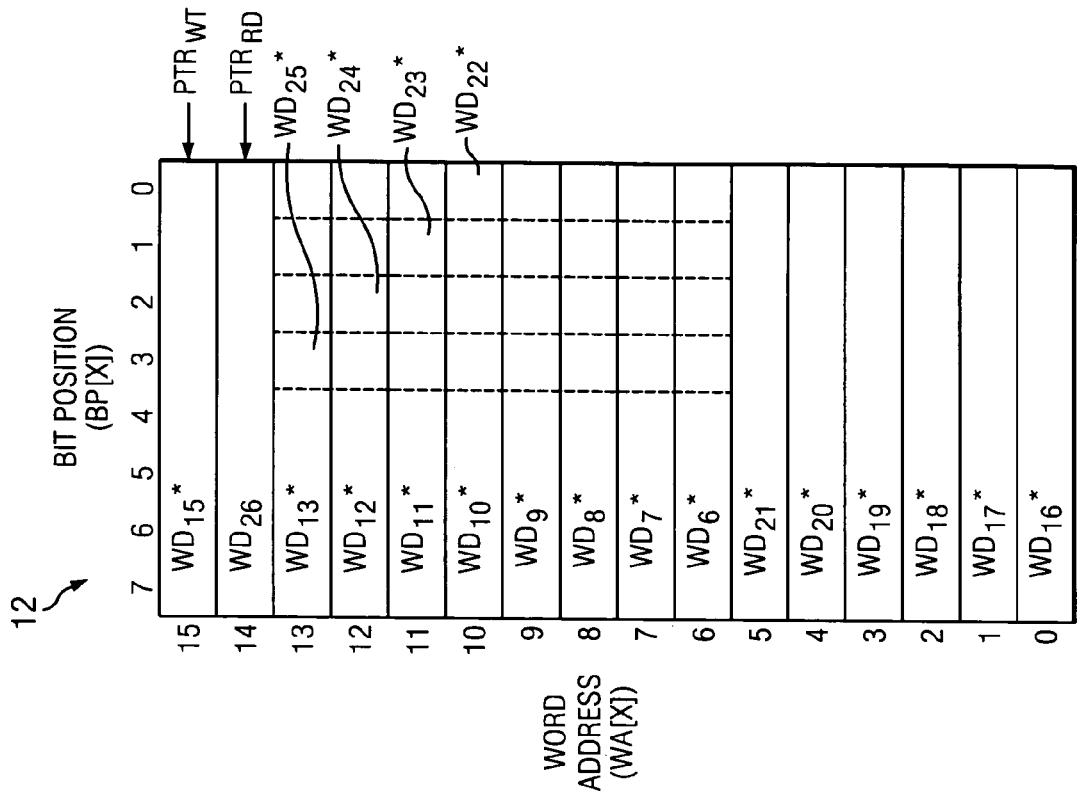
FIG. 2M illustrates FIFO 12 of FIG. 2L after the reading of one additional data word from the FIFO, where the read word is stored during an overflow condition.
Figure 2N:
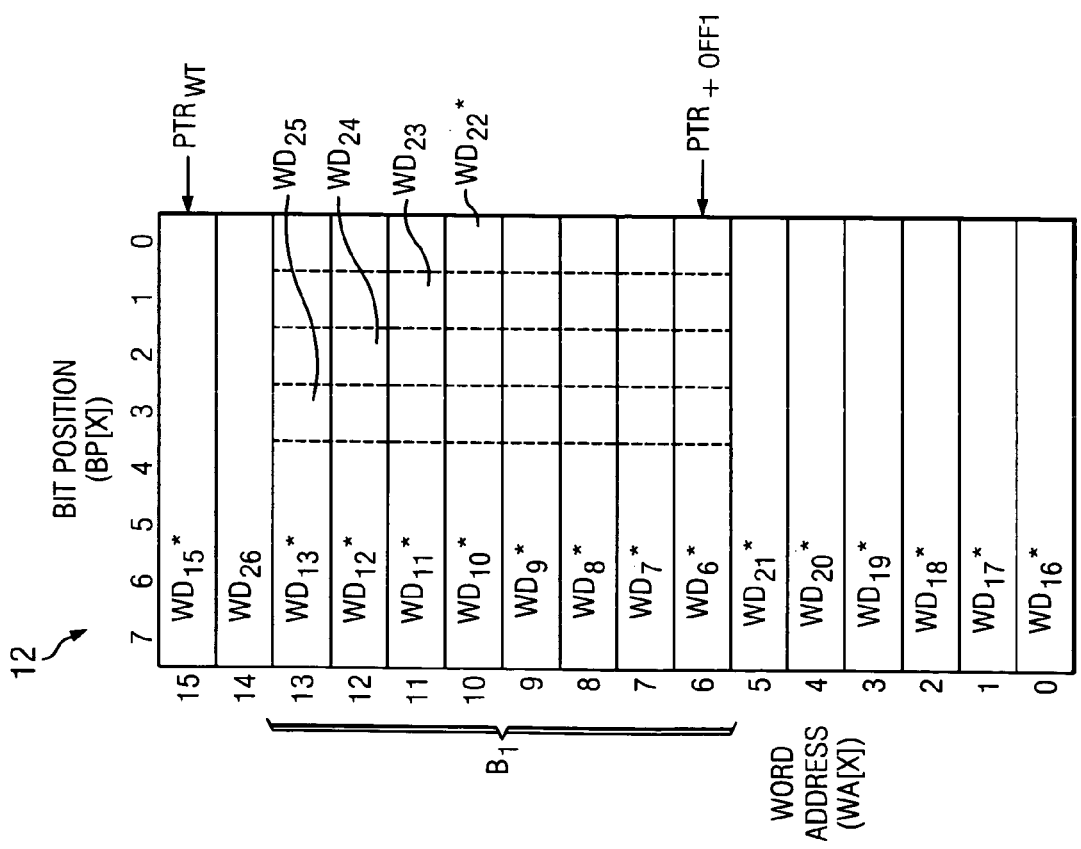
FIG. 2N illustrates FIFO 12 of FIG. 2M after the reading of three additional data words from the FIFO, where the read words are stored during an overflow condition.
Figure 3A:
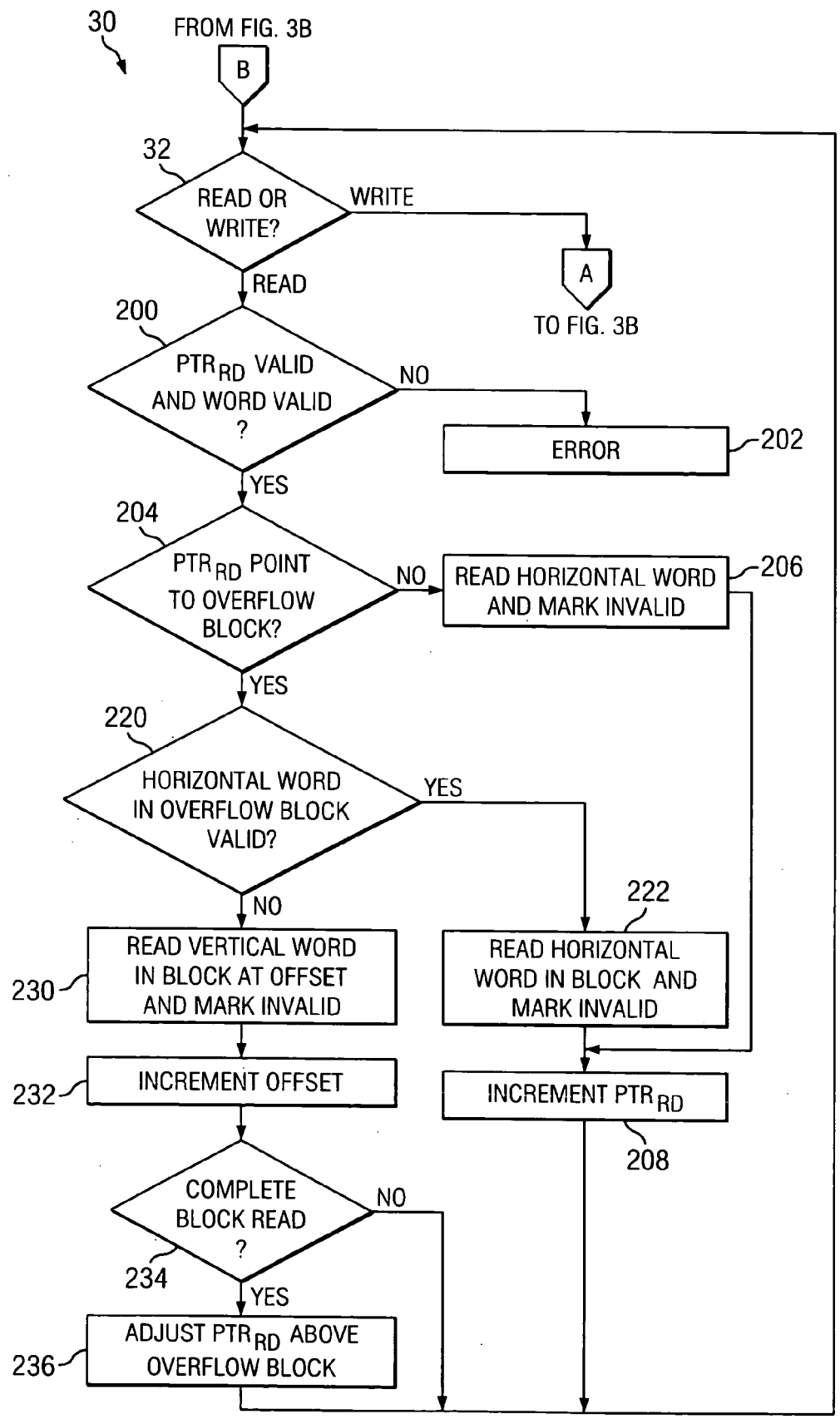
FIGS. 3A and 3B illustrate a flow chart of the general preferred operation of system 10.
Figure 3B:
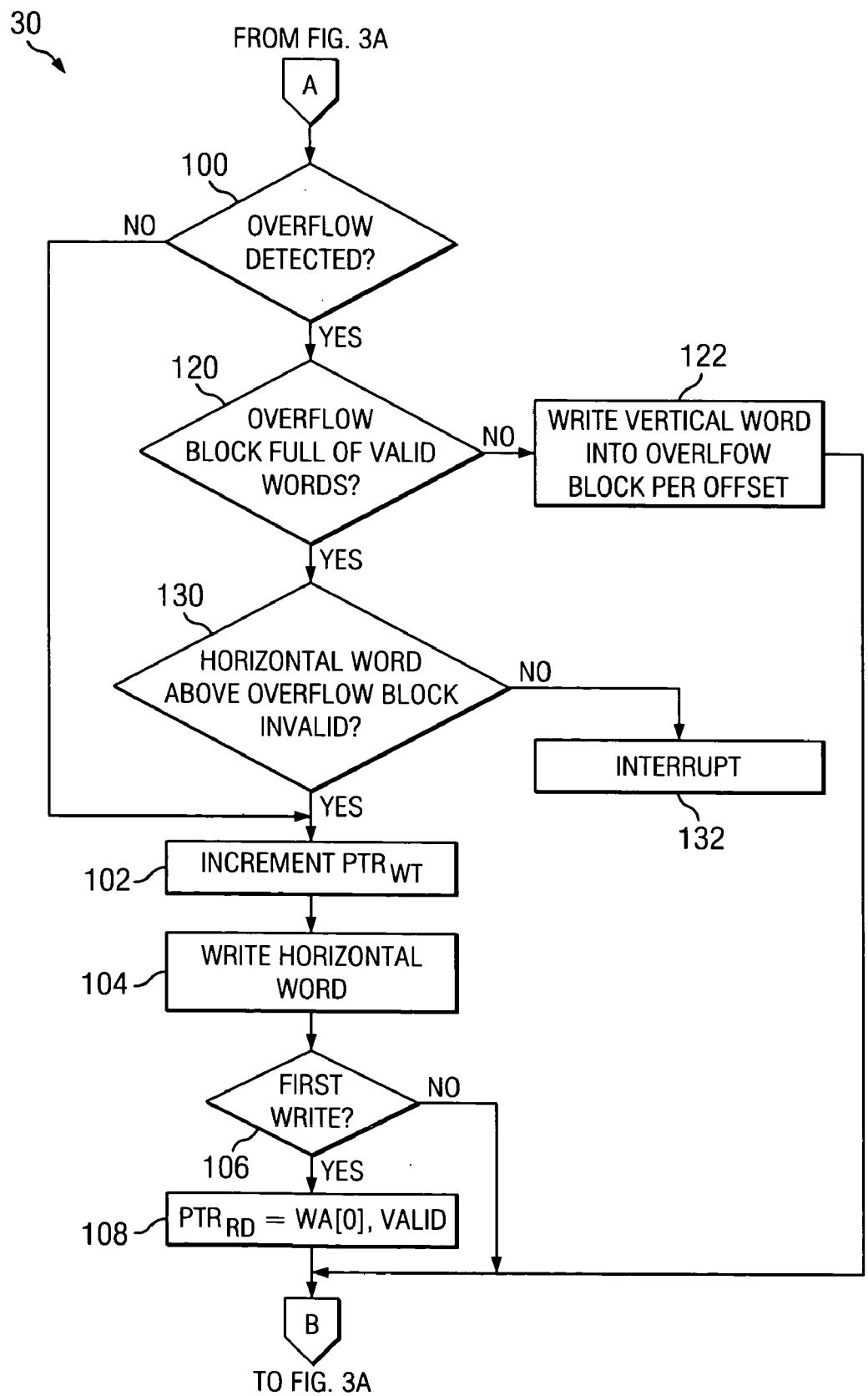

FIGS. 2A through 2N illustrate an example of a sequence of operations of system 10 with respect to FIFO 12, and for sake of simplification only the pointers and FIFO 12 mentioned above are shown in those Figures, while one skilled in the art should appreciate that the remaining circuitry of FIG. 1 may be used to perform the control and remaining operations now described. Further, the specific steps to implement the example of operation may vary in certain respects, where the later FIGS. 3A and 3B provide a general flow chart also by way of example to implement the example of FIGS. 2A through 2N and also as will apply to other examples.

Looking first to FIG. 2A, FIFO 12 is shown to include the 16 horizontal word slots introduced above, and for sake of reference in this document each is shown to have an address WA[x]; for example, at the bottom of FIFO 12, the first word slot has an address WA[0], and immediately above that word slot is word slot WA[1], and so forth upward to the top of FIFO 12, which concludes with word slot WA[15]. Further, each word slot is preferably of a same size and in the illustrated example stores an 8-bit word, from least significant bit position BP[0] through most significant bit position BP[7], although in an alternative embodiment these bit positions may be reversed. FIG. 2A also indicates the address indication of the read pointer $PTR_{RD}$ and write pointer $PTR_{WT}$ when no data has yet been written to FIFO 12, such as at device start-up or following some type of reset or the like. Thus, both of these pointers are shown to point to word address WA[0]. Lastly, as shown by way of a vertical arrow above these pointers, and as will be further understood below, each pointer generally advances (or increments) upward following a corresponding read or write, and when the pointers reach word address WA[15] at the top of FIFO 12, they wrap around back to the lowest FIFO address, WA[0], as shown in FIG. 2A.

FIG. 2B illustrates FIFO 12 after a total of seven words $WD_0$ through $WD_6$ have been written into FIFO 12, yet where no read operation has taken place. Each immediately successive word is written into an immediately successive word address. Thus, the first word, $WD_0$, is written into the location indicated by write pointer $PTR_{WT}$, which as shown in FIG. 2A is the word address WA[0]. Next, word pointer $PTR_{WT}$ is incremented once to point to word address WA[1], and the next immediately successive word, $WD_1$, is written to this incremented word address, WA[1], and so forth through the writing of word $WD_6$ into word address WA[6]. Following the write of word $WD_6$ into word address WA[6], write pointer $PTR_{WT}$ therefore points to the next word address, WA[7], into which the next word will be written. Further, because no read has yet taken place, then read pointer $PTR_{RD}$ continues to point to word address WA[0], that is, the location from which the next (i.e., first in this example) read will take place.

FIG. 2C illustrates FIFO 12 after an additional eight words, $WD_7$ through $WD_{14}$, have been written into FIFO 12. Thus, write pointer $PTR_{WT}$ is incremented for each write, and now points to the next word address, WA[15], into which the next write will occur. FIG. 2C also illustrates that a read of four words, $WD_0$ through $WD_3$, has occurred. In this regard, read pointer $PTR_{RD}$ is incremented for each word read, and it now points to the next word address, WA[4], from which the next read will occur. Additionally, as each word is read, an indication is recorded, such as by setting a flag in association with the word, to indicate that the word has been read so that it is not re-read later. To illustrate this aspect, each read word is further identified with an asterisk in FIG. 2C, and this convention is also used in the remainder of this document. Thus, in FIG. 2C, the read words are actually shown as $WD_0$* through $WD_3$*. Additionally, in some contexts, a flag or comparable designation of this sort is said to indicate that the copy of the data word remaining in FIFO 12 is invalid once it has been read.

FIG. 2D illustrates, in part, the pointer wraparound operation introduced above. Particularly, FIG. 2D illustrates FIFO 12 after an additional two words, $WD_{15}$ and $WD_{16}$, have been written into FIFO 12. Note that after word $WD_{15}$ is written, write pointer $PTR_{WT}$ is incremented, but it wraps around to the bottom of FIFO 12 and thereby once again points to word address WA[0]; on the next write, that is of word $WD_{16}$, that word is therefore written to that word address, and write pointer $PTR_{WT}$ is again incremented to point to word address WA[1] as shown in FIG. 2D. FIG. 2D also illustrates that a read of two more words, $WD_4$ and $WD_5$, has occurred, and consistent with the above, therefore, these words are designated as invalid (with the asterisk designation) and read pointer $PTR_{RD}$ is incremented for each read, thereby leaving it to now point to the next word address, WA[6], from which the next read will occur.

FIG. 2E illustrates FIFO 12 after an additional five words, $WD_{17}$ through $WD_{21}$, have been written into FIFO 12, while no additional read operations have occurred. At this point, therefore, write pointer $PTR_{WT}$ and read pointer $PTR_{RD}$ both point to the same word address, which in the illustrated example is WA[6]. If the next data input/output operation to occur is a write, then the condition thus illustrated in FIG. 2E is referred to in the art as an overflow, that is, an additional write of the next word (i.e., which would be $WD_{22}$) into word address WA[6] would overwrite the valid (i.e., unread) data word $WD_6$ that is stored at that address. As mentioned earlier in the Background Of The Invention section of this document, the prior art has certain mechanisms for responding to this overflow and thereby preventing the overwriting of valid data. The preferred embodiments, as further demonstrated below, provide an alternative and inventive approach to such an event. Also in this regard, therefore, note that the potential overflow may be detected by controller 14 (FIG. 1) when, following an initial write into FIFO 12, there is later a request to write while both read pointer $PTR_{RD}$ and write pointer $PTR_{WT}$ are point to the same word address.

FIG. 2F illustrates the resultant preferred embodiment operation of the circuitry of system 10 of FIG. 1, as implemented in connection with FIFO 12, in response to an overflow. By way of example, FIG. 2F illustrates the write of a next successive word, $WD_{22}$ following the impending overflow condition shown in FIG. 2E. According to the preferred embodiment, when an overflow is detected, as would occur if a write were requested following the status of FIG. 2E, then the next word written to FIFO 12 is not written along a single word address, but instead that data is written across multiple word addresses. In one preferred embodiment, and as shown in FIG. 2F, the multiple word addresses start by a write of the least significant bit ("LSB") at the word address location of the overflow condition and each more significant bit is written to a contiguous and incremented word address; thus, in FIG. 2F, word $WD_{22}$ is written such that its LSB is written into bit position BP[0] of word address WA[6], its next most significant bit is written into bit position BP[0] of word address WA[7], and so forth so that the entire word $WD_{22}$ is written into the bit position BP[0] of word addresses WD[6] through WD[13]. For sake of simple reference in this document, therefore, it may be said that word $WD_{22}$ is written vertically into FIFO 12, as compared to the horizontal nature of each individual word address. In one preferred embodiment, the indication of the use of the vertical bit position BP[0] across the eight word addresses is provided by an offset value OFF0, which is intended to indicate an offset of zero from the bit position BP[0], as further appreciated below from additional offset values. In the illustration of FIG. 2F, therefore, the offset value provides a bit addition to the word indication of write pointer $PTR_{WT}$ and, thus, for sake of reference this combination is shown in FIG. 2F as $PTR_{WT+OFF0}$. In other words, when an overflow is detected and for the next write, the word is written vertically starting at the address indicated by $PTR_{WT+OFF0}$. From the preceding, note that the described operation causes word $WD_{22}$ to overwrite the LSB of each of the valid words $WD_6$ through $WD_{13}$, where those words collectively are shown as an overflow block $B_1$. As demonstrated later, while the LSBs of the data words in overflow block $B_1$ are thereby possibly changed (i.e., if the new data is different from the already-written data), some of the most significant bits of those same data words are preserved and therefore may be later read to maintain some level of data integrity without stopping operation of FIFO 12 in response to the overflow condition.

FIG. 2G illustrates FIFO 12 from FIG. 2F following a write of the next sequential word, $WD_{23}$, into that FIFO. In the preferred embodiment, for a number of write operations following the overflow, each written word is oriented in a comparable manner to the first overflow word, that is, to not be written along a single horizontal word address but instead to be written across multiple word addresses. In a preferred embodiment, the manner of writing a number of additional overflow words after the first overflow word is across the same multiple number of horizontal word addresses; thus, since FIG. 2F illustrates the vertical writing of overflow word $WD_{22}$ across eight contiguous word addresses, then in FIG. 2G the next successive overflow word $WD_{23}$ also is written vertically across those same contiguous word addresses, where those addresses in both FIGS. 2F and 2G are WA[6] through WA[13]. However, in FIG. 2G, the offset is incremented and shown as an offset value OFF1, whereby the overflow word $WD_{23}$ is thus written into bit position BP[1] across all of word addresses WA[6] through WA[13]. Accordingly, in FIG. 2G, the offset value OFF1 is intended to indicate an offset of one from the bit position BP[0], and it provides a bit addition as well as a vertical write orientation to the word indication of write pointer $PTR_{WT}$ and is therefore shown as $PTR_{WT+OFF1}$. From the preceding, the described operation causes word $WD_{23}$ to overwrite an additional bit of each of the valid words $WD_6$ through $WD_{13}$ in block 1. Accordingly, upon completion of the write shown in FIG. 2G, the two LSBs of the data words in overflow block $B_1$ are thereby possibly changed by the respective vertically-written words $WD_{22}$ and $WD_{23}$.

FIGS. 2H and 2I illustrate two additional writes into FIFO 12 of words $WD_{24}$ and $WD_{25}$, respectively, where again those writes are understood to follow the overflow condition following a write after the state of FIG. 2G. Recalling that in the preferred embodiment a number of write operations follow the overflow and write data in a comparable manner across multiple word addresses (i.e., vertically), in one example of a preferred embodiment the total number of such write operations is equal to half of the bit precision of each word; thus, in the present example, where each word in FIFO 12 is an 8-bit word, then in response to a detected overflow condition, then one-half of those 8 bits, that is, 4 bits, are overwritten vertically by overflow words. Accordingly, in FIG. 2H, the third overflow word, $WD_{24}$, is written vertically into bit position BP[2] of each word address in overflow block $B_1$, as determined by an offset OFF2 and indicated relative to the write pointer as $PTR_{WT+OFF2}$, and in FIG. 2I, the fourth overflow word, $WD_{25}$, is written vertically into bit position BP[3] of each word address in overflow block $B_1$ as determined by an offset OFF3 and indicated relative to the write pointer as $PTR_{WT+OFF3}$. From the preceding, by the completion of the status of FIG. 2I, the least significant half of the bits in each horizontal data word in overflow block $B_1$ has been overwritten. Thus, these data values are somewhat compromised as opposed to the original values. However, as shown below, in some applications the preservation of the more significant bits of these horizontal data words still provides some level of reliable data to be read and used for those applications.

Before proceeding with a discussion of FIG. 2J and later Figures, note that the remainder of the example as demonstrated in FIGS. 2J through 2N assumes that the next operation following FIG. 2I is a word read and, indeed, as shown later it is assumed that multiple reads first occur, prior to any additional write, such that all horizontal data words in overflow block $B_1$ are read prior to a next write. Given this assumption, and looking now to FIG. 2J, then write pointer $PTR_{WT}$ is advanced to the next highest word address following overflow block $B_1$, which in the example of FIG. 2J is word address WA[14]. However, if the next operation, prior to the read of the horizontal data in overflow block $B_1$, were a word write, then there arises a consideration of to what location within FIFO 12 would the next word be written. In the example of a preferred embodiment in FIG. 2J, once half of the bit precision has been overwritten in overflow block $B_1$ a shown in FIG. 2I, then an immediately subsequent call for a write is interpreted as an unacceptable overflow, and an appropriate response is taken. For example, controller 14 may issue a system interrupt so that no more data is accepted by FIFO 12 until certain data, as appreciated below, is read from that FIFO. However, such an approach may not be acceptable in some implementations because it necessarily disrupts the effort of any upstream circuit from writing data, which may not be workable; in those cases, a more aggressive response, such as a system reset may be taken. Still further, in an alternative preferred embodiment and once half of the bit precision has been overwritten in overflow block $B_1$ as shown in FIG. 2I, then in an immediately subsequent call for a write, the next word may be written across multiple horizontal word addresses in another block in FIFO 12; for example, in the case of FIG. 2I and for a continuing overflow condition, the next word, $WD_{26}$ (not shown), could be written to a second overflow block that spans bit position BP[0] of word addresses WA[14], WA[15], and WA[0] through WA[5], with still additional words also written to that second overflow block. Such an approach necessarily will require additional complexity as compared to permitting the writing only to the single overflow block, $B_1$, in FIG. 2I, although in some instances such complexity may be deemed to be worthwhile.

Concluding FIG. 2J, and also as part of the current example, following the write of words $WD_{22}$ through $WD_{25}$, a read of six data words occurs. Recalling from FIG. 2I that read pointer $PTR_{RD}$ was previously pointing to word $WD_6$, then the FIG. 2J read of six words thereby consists of a read of words $WD_6$ through $WD_{11}$, which as read are one by one designated as invalid as shown in FIG. 2J by the above-introduced asterisk convention. Further, following that read, read pointer $PTR_{RD}$ points to the next word address, WA[12], from which the next word will be read.

FIG. 2K illustrates FIFO 12 following the state of FIG. 2J, and where seven additional words have been read from FIFO 12. Recalling from FIG. 2J that read pointer $PTR_{RD}$ was previously pointing to word address WA[12], then the FIG. 2K read of seven words thereby consists of a read of words $WD_{12}$ through $WD_{18}$, which includes the wraparound to and beyond word address WA[0], where read pointer $PTR_{RD}$ thereby points to the next successive word address, WA[3], following the last word that was read. Additionally, the seven read words are designated as invalid after having been read. FIG. 2K also illustrates, following the read of the data word at word address WA[15], an additional write of the next sequential word, $WD_{26}$, into FIFO 12 and more particularly into word address WA[15]. Note that in the preferred embodiment this horizontally-oriented write is permitted so long as the data at the word address already has been read, which in the present example will be recognized to have occurred since the data (i.e., $WD_{14}$) at that word address and prior to the write of $WD_{26}$ will have been marked as invalid once so read. In other words, recall above there is introduced the notion of writing a word after the maximum number of words (e.g., four words in the illustrated example) have been written vertically into overflow block $B_1$. FIG. 2K illustrates that, provided the horizontal word above the overflow block has been read, then the next write operation is performed horizontally at the next horizontal address above overflow block $B_1$. Accordingly, in FIG. 2K, word $WD_{26}$ is written into word address WA[14] and write pointer $PTR_{WT}$ is incremented to point to the next address, WA[15], into which the next data word will be written.

FIG. 2L illustrates FIFO 12 following the state of FIG. 2K, and where three additional words have been read from FIFO 12. Recalling from FIG. 2K that read pointer $PTR_{RD}$ was previously pointing to word address WA[3], then the FIG. 2L read of three words thereby consists of a read of words $WD_{19}$ through $WD_{21}$, which thereby advances read pointer $PTR_{RD}$ to the bottom of overflow block $B_1$ (i.e., word address WA[6]). However, recall that four vertical words have been written into overflow block $B_1$. In this regard, controller 14 of system 10 includes sufficient circuitry, as may be ascertainable by one skilled in the art, to detect that such words have been written. Thus, read pointer $PTR_{RD}$ also is informed of an offset for the next word to be read, which in the example of FIG. 2L is the word at an offset of zero. As a result, in FIG. 2L, that offset is shown in relationship to the read pointer as $PTR_{RD+OFF0}$, thereby indicating that the next word to be read is $WD_{22}$ as aligned vertically along bit position BP[0] within overflow block $B_1$.

FIG. 2M illustrates FIFO 12 following the state of FIG. 2L, and where one additional word has been read from FIFO 12. Recalling from FIG. 2L that read pointer $PTR_{RD}$ was previously pointing to word address WA[6] with a zero offset (i.e., +OFF0), then the FIG. 2M read of one word consists of a read of word $WD_{22}$, which is therefore indicated with an asterisk in FIG. 2M. However, recall that overflow block $B_1$ includes a total of four vertical words. Thus, rather than a horizontal increment of read pointer $PTR_{RD}$, in the preferred embodiment the offset is incremented for each read vertical word until all vertical words in overflow block $B_1$ are read. Thus, in FIG. 2M, since one word has been read, then read pointer $PTR_{RD}$ now has an offset of OFF1, shown collectively in the Figure as $PTR_{RD+OFF1}$. Accordingly, upon the next read, the vertical word at bit position BP[1] within overflow block $B_1$ will be read (i.e., data word $WD_{23}$).

FIG. 2N illustrates FIFO 12 following the state of FIG. 2M, and where three additional words have been read from FIFO 12. Recalling from FIG. 2M that read pointer $PTR_{RD}$ was previously offset to point to word $WD_{23}$ at bit position BP[1] of overflow block $B_1$, then the FIG. 2N read of three words thereby consists of a read of words $WD_{23}$, $WD_{24}$ and $WD_{25}$, at respective offsets of OFF1, OFF2, and OFF3. Following the last read, therefore, note that all vertical words within overflow block $B_1$ have been read, as also indicated as the offset OFFx has reached its maximum value, which in the present example is OFF3. Accordingly, after the read at $PTR_{RD+OFF3}$, read pointer $PTR_{RD}$ is incremented to point to the first horizontal word above overflow block $B_1$, which in the present example is at word address WA[14].

To further appreciate the preceding and looking to FIG. 2N, note that if the next input/output operation with respect to FIFO 12 is the read of another word, then in response word $WD_{26}$ is read from word address WA[14] and thereafter read pointer $PTR_{RD}$ will point to the same word address, WA[15], as then being indicated by write pointer $PTR_{WT}$. In that case, however, then write pointer $PTR_{WT}$ is pointing to a word address, WA[15], storing an invalid word. Therefore, in the preferred embodiment, a next word write (e.g., $WD_{27}$) is simply written horizontally into that word address, WA[15]. Continuing with this case, assume further that 15 additional horizontal words (e.g., $WD_{28}$ through $WD_{42}$) are written into FIFO 12 without any additional read operations from FIFO 12. At this point, therefore, the full capacity of FIFO 12 (i.e., 16 words) has been written without a read. At that point, again read pointer $PTR_{RD}$ and write pointer $PTR_{WT}$ will point to the same word address, but the word at that address is now valid. Accordingly, if the next requested input/output operation is a write, then as defined above, such an event is an overflow condition, as illustrated also by way of example in FIG. 2E. Thus, if following that overflow condition still another word, $WD_{43}$, were to be written to FIFO 12, then consistent with the preceding teachings that word would be written vertically across multiple horizontal word addresses rather than in a single horizontal word address. Moreover, in the preferred embodiment, the writing of word $WD_{43}$ would be starting with the LSB of word $WD_{43}$ into in bit position [0] at word address WA[15], and then wrapping around to the bottom of FIFO 12 such that the remaining seven bits of words $WD_{43}$ would be written into bit position [0] of word addresses WA[0] through WA[6]. In other words, a new overflow block would be defined into which four vertical words would be written in response to the overflow condition. Once more, therefore, rather than discarding these words that follow the overflow condition or responding immediately to the overflow with an interrupt, four words following the overflow are instead preserved and stored into FIFO 12.

Another observation relating to the preferred embodiments is made by returning to FIGS. 2I and 2J; recall that those two Figures illustrate the reading of the horizontally stored words in overflow block $B_1$ (i.e., $WD_6$ through $WD_{13}$). However, as each of those words is read, the last four bits of each such word has been overwritten by the vertically stored words in overflow block $B_1$. Thus, to the extent that the particular bits in the vertically-stored words differ from the bit values of the pre-existing horizontally-stored words, then the accuracy of the data in the last four bits of those horizontally-stored words is compromised. Nonetheless, the accuracy of the more significant bits in the horizontally-stored words is maintained because those bits are not overwritten; thus, the preserved more significant bits may be read and used by the overall system that is relying on such data. The tolerance of a system's ability to use only these more significant bits is dependent on the type of system, and may well be acceptable in certain applications where greater precision is unnecessary. For example, in some audio applications, a temporary loss of data precision of this type may be acceptable. As another example and as further illustrated below, in certain screen data traces, a minor deviation in the screen display may occur as a result of the loss of precision, but this may be an acceptable tradeoff as compared to a large deviation or a system interrupt due to a FIFO overflow condition. Still further, note that the extent of the loss in accuracy may be adjusted in alternative embodiments by changing the ratio of the number of bits used for vertical storage in a block. In other words, in the above-described preferred embodiment, half of the bits (e.g., four of the eight bits) are used to store vertical words, thereby compromising the data accuracy of the lower half of the horizontally-stored valid words in the overflow block. However, if greater precision is preferred for the horizontally-stored valid words in the overflow block, then a fewer number of the LSBs of those words can be used for vertical storage; thus, in the preceding case, by way of example, the vertical words could be stored only in bit positions BP[0] and BP[1]; in that case, the upper six MSBs of the horizontally stored valid words in the overflow block are preserved, thereby providing greater precision in those words as they are read from FIFO 12. Indeed, numerous other examples may be ascertained by one skilled in the art whereby a different number of least significant bits are overwritten. The specific number of overwritten bits may be a user-provided parameter and/or it may depend on various application-specific parameters, including the number of horizontal bits available for the storage of each FIFO word (where eight such bits are shown in the preceding example).

With the above example having demonstrated in part the inventive scope, that scope is further illustrated by FIGS. 3A and 3B, which depicts a method 30 of operation of system 10; to facilitate the present discussion, method 30 is generally shown in a flowchart format so as to discuss the general sequence of events that occur for either a read or write operation by system 10. However, one skilled in the art will appreciate that certain steps may occur in an order other than that shown and the sequencing can be achieved with various hardware and/or software, including the use of one or more state machines. Also by way of introduction, method 30 does not contemplate each and every possible implementation detail, as from the remaining teachings of this document one skilled in the art may ascertain such design choices. By way of introduction to method 30, however, note that prior to reading and writing data, system 10 initializes various items, such as may occur at start-up or at reset. For example, the pointers discussed above, including read pointer $PTR_{RD}$ and write pointer $PTR_{WT}$ are initialized, as is the offset. In a generalized example, at start-up, write pointer $PTR_{WT}$ is initialized to point to the bottom of FIFO 12, that is, to word address WA[0]; further, because as of that point no valid data has been written into FIFO 12, then read pointer $PTR_{RD}$ is set to an invalid state, to thereby indicate that an effort to then read FIFO 12, without a write first occurring, would be an invalid operation. Lastly, for sake of separating the read and write operations, the offset aspect introduced above is separated into a read offset and a write offset, and prior to step 32 both of these values are initialized to a value of zero.

Turning to method 30 in detail, it commences with a decision step 32 that represents a wait state until system 10 is called to either read data from, or write data to, FIFO 12. If a write is to be performed, then method 30 continues from step 32 to step 100, whereas if a read is to be performed, then method 30 continues from step 32 to step 200. For sake of simplicity, the following discussion first discusses the flow of a write as performed by step 100 and the steps following it, with a later discussion of a read as indicated by step 200 and the steps following it. This choice simplifies at least one example in that some valid data is then presumed to be written to FIFO 12 so that it later may be read. However, other scenarios are also detailed later, including an overflow condition as also illustrated above in FIGS. 2A through 2N.

Turning now to the write operations associated with method 30, in step 100 system 10 determines whether an overflow condition is present in FIFO 12. As shown above, this condition occurs when both read pointer $PTR_{RD}$ and write pointer $PTR_{WT}$ are point to a same word address WA[x], and that same word address stores a valid horizontal data word. If the condition of step 100 is not met, that is, if no overflow condition exists, then the flow continues from step 100 to step 102, whereas if there is an overflow condition, then the flow continues from step 100 to step 120. Each of these alternative paths is discussed below.

In step 102, being reached in some instances when no overflow condition occurs, then method 30 increments write pointer $PTR_{WT}$. Thus, with respect to system 10, this increment effectively advances the write pointer to point to a next horizontal word address, WA[x], in FIFO 12. Further, write pointer $PTR_{WT}$ may be readily constructed by one skilled in the art to wraparound appropriately if the increment step advances it beyond the top of FIFO 12. Next, method 30 continues from step 102 to step 104.

In step 104, system 10 writes the present data word horizontally into the word address, WA[x], then indicated by write pointer $PTR_{WT}$. Thus, step 104 represents a typical write in a non-overflow condition, such as shown by way of example earlier in FIGS. 2B, 2C, and 2D. Next, method 30 continues from step 104 to step 106.

Step 106 is a conditional step that determines whether the write that occurred in the immediately-preceding occurrence of step 104 was the first write into FIFO 12 since the time of start-up (or reset). If the write was not the first write, then method 30 returns from step 106 to step 32 to await the next input/output operation. However, if step 106 determines that the immediately-preceding occurrence of step 104 was the first write into FIFO 12, then method 30 continues to step 108. In step 108, read pointer $PTR_{RD}$ is set to a valid state, thereby indicating, and as shown below in connection with the reading operations of method 30, that a valid read may now occur. After read pointer $PTR_{RD}$ is set to valid, method 30 returns from step 108 to step 32 to await the next input/output operation.

Returning now to step 100, recall that it passes the flow to step 120 if an overflow condition in FIFO 12 is detected. Step 120 then evaluates whether there is a full block of valid overflow words in FIFO 12; thus, in connection with the preferred embodiment, such a block exits when there are a maximum number of vertical words stored across a number of horizontal word addresses. By way of the earlier example illustrated in FIG. 2K, step 120 would determine that its condition is satisfied if four such vertical words were stored across the same eight horizontal word addresses. Of course, if in an alternative embodiment the manner of storing overflow words across different horizontal word addresses were changed, then the condition of step 120 would be changed to correspond to that change. In any event, if the overflow block is not full, then method 30 continues from step 120 to step 122; conversely, if the overflow block is full, then method 30 continues from step 120 to step 130.

In step 122, which from the above is reached once an overflow condition is detected and the overflow block is not yet full, then system 10 writes a vertical word into the overflow block. As detailed above, the particular bit location of the vertical write is controlled by an appropriate offset. Thus, in the case of a block that stores up to four vertical words, then step 122 writes in response to write pointer $PTR_{WT}$, as further modified in response to the appropriate one of the write offsets OFF0, OFF1, OFF2, and OFF3. Following the write, method 30 returns from step 122 to step 32 to await the next input/output operation.

Looking now to the alternative of step 130, recall it is reached when an overflow condition is detected and the overflow block is full of valid overflow words. In response, step 130 determines whether the horizontal word address, WA[x], immediately above the overflow block, stores an invalid word. Note in this regard that "immediately above" is intended to indicate the next successive address in FIFO 12, corresponding to a single increment of word pointer $PTR_{WT}$. Thus, if the overflow block occupies the top of FIFO 12, then this next address would be the bottom word address, WA[0], of FIFO 12. In any event, if step 130 determines that an invalid word is stored above the overflow block, then method 30 continues from step 130 to steps 102 and 104; in that event, therefore, write pointer $PTR_{WT}$ is incremented and the next word is written horizontally just above the overflow block. Note that this operation is acceptable because the horizontal word being overwritten is invalid and, hence, by definition, previously has been read. To the contrary, if step 130 determines that that horizontal word address above the overflow block stores a valid word, then in the preferred embodiment it is not desirable to overwrite that valid word. As a result, method 30 continues from step 130 to step 132, in which case an interrupt is generated (or another overflow block is considered in a more complex preferred embodiment, although this is not shown in the Figure so as to simplify the diagram). System 10 may then be configured to respond to this interrupt in an appropriate manner, such as some type of user warning that the write cannot occur or another type of warning.

Turning now to the read operations associated with method 30, in step 200 system 10 determines whether read pointer $PTR_{RD}$ is valid. Recall that at start-up (or reset) this pointer is set to invalid. Thus, if after start-up, and prior to a write, a read is attempted, then step 200 detects this invalid status and directs the flow to step 202. In step 202, an error is reported and also may be further acted upon. Recall also, however, that per steps 106 and 108, following the write of a first valid word into FIFO 12, write pointer $PTR_{WT}$ will be valid. This latter status also may be detected by step 200, in which case method 30 continues from step 200 to step 204.

In step 204, system 10 determines whether read pointer $PTR_{RD}$ is pointing to an overflow block, that is, whether the word address, WA[x], to which read pointer $PTR_{RD}$ is then pointing includes a vertically oriented word at that location. Note in this regard that one skilled in the art may readily ascertain various manners to implement a flag or the like associated with a word address when such a vertical word is written thereto. In any event, if read pointer $PTR_{RD}$ is not pointing to an overflow block, then method 30 continues to steps 206 and 208, whereas if read pointer $PTR_{RD}$ is pointing to an overflow block, then method 30 continues from step 204 to step 220. Each of these alternative paths is discussed below.

Steps 206 and 208 are directed to a word read when no overflow block is involved in the read. Specifically, in step 206, system 10 reads a horizontal word at the word address, WA[x], then indicated by read pointer $PTR_{RD}$, and the read word is marked invalid. Next, in step 208, read pointer $PTR_{RD}$ is incremented, thereby pointing to the next horizontal address in FIFO 12 from which the next word will be read. Thereafter, method 30 returns from step 208 to step 32 to await the next input/output operation.

In step 220, having been reached because read pointer $PTR_{RD}$ is pointing to an overflow block, system 10 determines whether the horizontal word then indicated by read pointer $PTR_{RD}$ is valid. If so, then method 30 continues from step 220 to step 222, where the horizontal word is read and marked invalid; an example of this instance was described earlier above in connection with FIG. 2J and the reading of word $WD_6$. Thereafter, method 30 continues from step 222 to step 208, which is described above. Returning to step 220, if the horizontal word then indicated by read pointer $PTR_{RD}$ is invalid, then method 30 continues from step 220 step 230.

Step 230 is reached in an instance such as the scenario illustrated by way of example in FIG. 2L, that is, when read pointer $PTR_{RD}$ points to the bottom of an overflow block and the word at the then-indicated word address, WA[x], is invalid (i.e., already has been read). Accordingly, in this case method 30 continues to step 230 wherein a vertical word is read from the overflow block, and according to the appropriate offset. For a first vertical word read, the read offset should be earlier initialized to OFF0, thereby causing a first instance of step 230 to read the vertical work at bit position BP[0] in the overflow block. Once the vertical word is read, it is marked invalid and method 30 continues to step 232.

Step 232 increments the read offset, thereby advancing it in the sequence of OFF0, OFF1, OFF2, OFF3, and returning it to OFF0 following OFF3. Thus, if the read in the immediately-preceding occurrence of step 230 was at an offset of OFF0, then the next vertical read will be at offset OFF1, and so forth, until all offsets have been used. Following step 232, method 30 continues to step 234.

In step 234, system 10 determines whether the complete overflow block has been read. This determination may be made in various manners, such as with reference to the then-current value of the read offset, or by determining whether each vertical word in the overflow block is marked as invalid. In any event, if the vertical overflow block is not fully read, then method 30 returns to step 32 to await the next input/output operation. Note, therefore, if that operation is another read, then read pointer $PTR_{RD}$ is unchanged and will still indicate the overflow block, but the increment operation of the ready offset by step 232 will cause the next successive vertical word in that block to be read. To the contrary, if step 234 determines that the entire overflow block has been read, then the flow continues to step 236. In step 236, system 30 adjusts read pointer $PTR_{RD}$ to point to the next horizontal word address, WA[x], above the overflow block. Thus, in the example of FIGS. 2A through 2N where the overflow block includes eight word addresses, then step 236 would increase read pointer $PTR_{RD}$ by a value of modulo eight, thereby wrapping around if necessary. As a result, the next read, assuming the word above the overflow block is valid, may occur of the horizontal word stored at that next-indicated horizontal word address.

Having demonstrated the preferred embodiment as a system in various manners, note further that the implementation of that system in connection with a preferred embodiment device is further contemplated as within the present inventive scope. Specifically, there are generally two types of data-processing or data transfer devices. A first type requires 100 percent data integrity, as is often the case for central processing unit code, encoded/compressed data, and certain networking implementations. A second type permits some data degradation, which is often the case in a large range of signal processing applications where raw, "natural" data is being sampled and then transferred and processed. Certain examples of this second type include raw audio streams, bitmap images, uncompressed video, and the like. Accordingly, devices that may be characterized in this second type are those that fall within the present inventive scope as incorporating system 10 into their data path. To further illustrate this aspect, one particular implementation of this type is described below.

FIG. 4A illustrates a computing device 300 which is typical of various modern hand-held computing type devices or the like. The figure depicts only three blocks so as to simplify the discussion, where one skilled in the art will appreciate that such a device may include numerous other aspects. In the general depiction of FIG. 4A, device 300 includes a display screen 302, an input area 304, and system 10, where system 10 is representative in block form of that same system as shown in FIG. 1 and also described in FIGS. 2A through 2N and FIGS. 3A and 3B. In the example, input area 304 provides one or more mechanisms for a user to provide input data to device 300, which may include a keyboard and/or a touch screen area. Additionally, data may be entered by touching screen 302, such as with a stylus or inkless pen or other device and where that data in some instances is shown in traced form on screen 302 to confirm to the user the path of the stylus along screen 302. In any event, the data entered into input area 304 or via screen 302 is connected to system 10, so it may be connected to FIFO 12 therein (not shown). Of course, additional processing circuitry is likely to be involved with that data, but for the present example it is assumed that at some point in the data path, data to be output at screen 302 is stored in the FIFO of system 12 and, thus, is read out so as to display images on screen 302.

FIG. 4B illustrates an example of a depiction of a screen 302' that might result using a FIFO according to the prior art rather than system 10, and in response to an overflow condition. Specifically, in FIG. 4B, a trace $TR_1$ is shown, along with a corresponding stylus trajectory $ST_1$, where the stylus trajectory is intended to reflect an instance where a user traces a line of input along the surface of screen 302'. Ideally, a device like device 300 should reflect the user input along screen 302' by projecting a trace $TR_1$ that matches stylus trajectory $ST_1$ or very closely approximates it, so as to present the user with an image that portrays the line of travel of the stylus across screen 302'. However, in the example of FIG. 4B, and above an imaginary line $L_1$, there is shown a great divergence between trace $TR_1$ and stylus trajectory $ST_1$, where the intent of this Figure is to illustrate the possible result of an overflow condition in a prior art FIFO. In other words, were such a FIFO to overflow with data, then any data written into the FIFO following the overflow would overwrite older yet valid data, and once there are subsequent data reads, the newer-written data is used rather than the desired older yet valid data. As a result, the use of that data, which in the present example is shown in the form of stylus trajectory $ST_1$, above line $L_1$, produces above line $L_1$ what is likely to reflect vastly inaccurate results.

By way of contrast to FIG. 4B, FIG. 4C illustrates an example of a depiction of screen 302 that might result using a FIFO according to the preferred embodiments, that is, where system 10 is included in device 300 as shown in FIG. 4A. Thus, in FIG. 4C, trace $TR_1$ is again shown, along with a corresponding stylus trajectory $ST_2$, where once again the stylus trajectory is intended to reflect an instance where a user traces a line of input along the surface of screen 302. Below an imaginary line $L_2$, it is assumed that no overflow condition occurs; thus, device 300 properly reflects the user input along screen 302 by projecting trace $TR_2$ to match stylus trajectory $ST_1$ or very closely approximate it. However, above line $L_2$, it is assumed that an overflow condition occurs in the FIFO of system 10. According to the preferred embodiment, and as detailed above, when the overflow occurs, the most significant bits of the older valid data are preserved and subsequently read. Thus, to a certain extent, the precision of that older data is maintained and, as a result, trace $TR_2$ still approximates stylus trajectory $ST_1$ above line $L_2$, or at least the divergence between trace $TR_2$ and stylus trajectory $ST_1$ is far less than that between trace $TR_1$ and stylus trajectory $ST_1$ shown in FIG. 4B. Moreover, above a line $L_3$, it is assumed that the overflow condition is cured, that is, the data in the overflow block in the FIFO of system 10 is fully read and output and thereafter no additional overflow occurs (i.e., only valid horizontally stored words remain in the FIFO of system 10). At that point, trace $TR_2$ and stylus trajectory $ST_1$ again match and note that due to the reduced divergence between those paths above line $L_2$ and below line $L_3$, then the convergence of those paths above line $L_3$ is not very abrupt. Accordingly, in this application, the preferred embodiment provides an acceptable level of performance for device 300.

Figure 5:
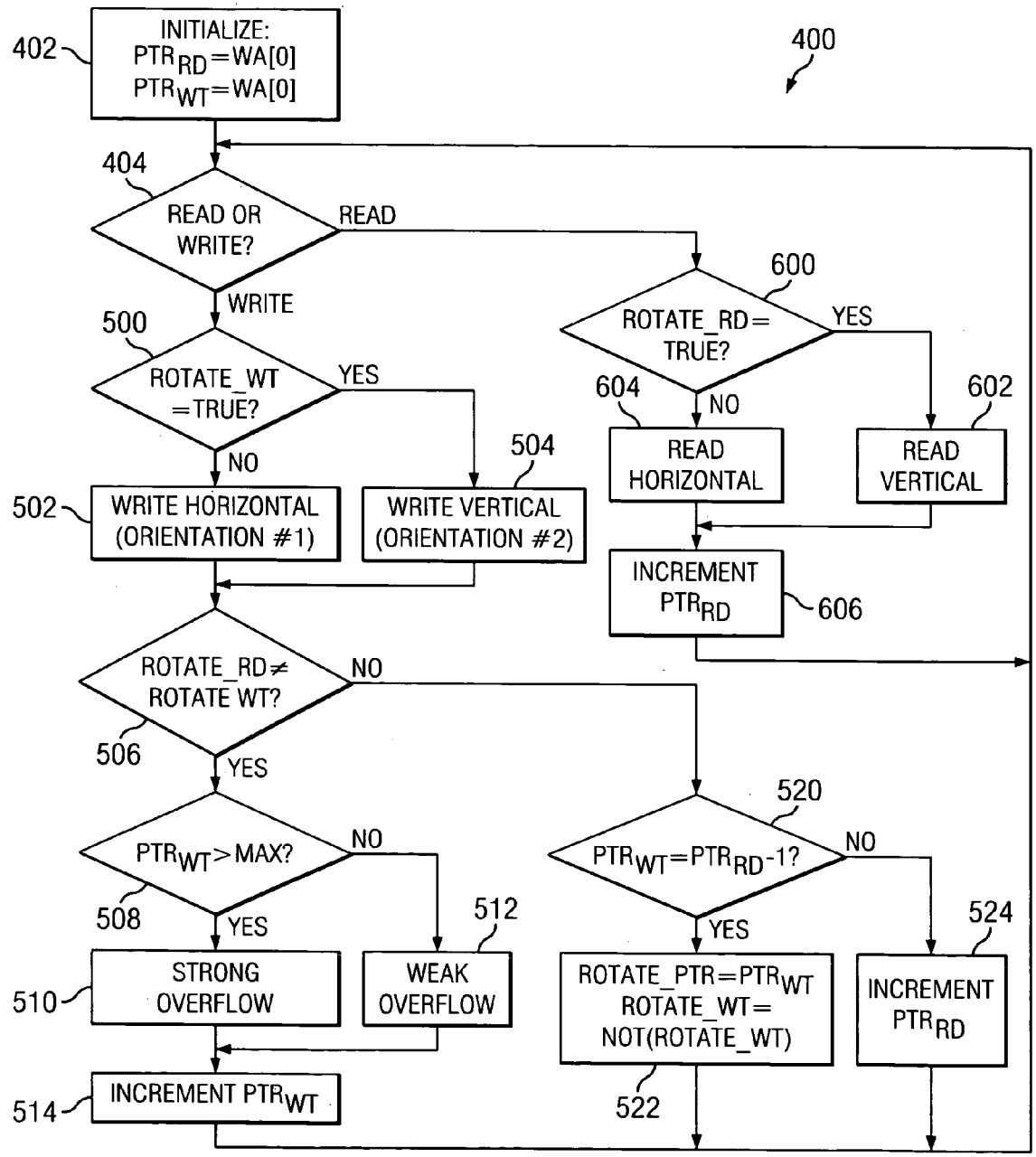
FIG. 5 illustrates an alternative flow chart of the general preferred operation of system 10.

Having demonstrated various of the inventive aspects above, FIG. 5 also illustrates a method of operation of system 10, where this method is designated as method 400 because it generalizes various of the principles discussed above, yet it also demonstrates that in the preferred embodiment a key aspect is that data is read or written in one orientation in a non-overflow state, and then data is read or written in a different orientation in an overflow state. In general, the flow of method 400 is comparable to that of method 30 described above, yet a few different aspects are described so as to further demonstrate the inventive scope. Further, method 400 also can be achieved with various hardware and/or software, including the use of one or more state machines.

Method 400 begins with an initialization step 402, which is followed by a read/write decision step 404 that is comparable to step 32 described earlier. First looking to step 402, it initializes read pointer $PTR_{RD}$ and write pointer $PTR_{WT}$. In a generalized example, step 32, which may occur by way of example at start-up or following a reset, both write pointer $PTR_{WT}$ and read pointer $PTR_{RD}$ are initialized to point to the bottom of FIFO 12, that is, to word address WA[0]. Next, step 404 represents a wait state until system 10 is called to either read data from, or write data to, FIFO 12. If a write is to be performed, then method 400 continues from step 404 to step 500, whereas if a read is to be performed, then method 400 continues from step 404 to step 600. For sake of simplicity, the following discussion first discusses the flow of a write as performed by step 500 and the steps following it, with a later discussion of a read as indicated by step 600 and the steps following it.

Turning now to the write operations associated with method 400, in step 500 system 10 determines whether a flag identified as ROTATE_WT is true. By way of explanation, note that this flag is represented as a binary state such as a bit in a register, and it is set when an overflow condition has been detected with respect to FIFO 12; the term "rotate" is used not by way of limitation, but only in the sense that, as discussed above, when an overflow occurs in the preferred embodiment, then reading and writing with respect to FIFO 12 is in an orientation that is different as compared to the orientation of data reading/writing with respect to FIFO 12 when an overflow has not occurred. More specifically, in the previous illustrations the difference in orientation is demonstrated as horizontal as compared to vertical orientation. Thus, one orientation may be said to be "rotated" with respect to the other; hence, in FIG. 5, the term "rotate" is intended to indicate this difference of orientation and it is included in certain flags such as the ROTATE_WT flag of step 500. Returning now to that flag, the actual mechanism for detecting the overflow and setting ROTATE_WT is further discussed below, and it is also further apparent to one skilled in the art given the other teachings in this document. Completing the discussion of step 500, if ROTATE_WT is false, then method 400 continues from step 500 to step 502, whereas if ROTATE_WT is true, then method 400 continues from step 500 to step 504.

Steps 502 and 504 represent write steps, where step 502 corresponds to a write when no rotation is required per decision step 500 and where step 504 corresponds to a write when rotation is required per decision step 500. In other words, step 502 is reached when ROTATE_WT is false, in which case no overflow has been detected; consequently, a write to FIFO 12 is performed in a manner comparable to the prior art, that is, to a standard orientation which is shown in step 502 as orientation #1, and which by way of example in the earlier discussion is shown as a horizontal write. Alternatively, however, step 504 is reached when ROTATE_WT is true, in which case an overflow has been detected; consequently, a write to FIFO 12 is performed in an inventive manner as discussed above and that differs from the orientation comparable to the prior art; thus, this non-conventional write is shown in step 502 as orientation #2, and which by way of example in the earlier discussion is shown as a vertical write. Thus, the write of step 504 is in effect rotated 90 degrees as compared to the write of step 502. In either event, following the appropriate one of steps 502 and 504, method 400 continues to a decision step 506.

Step 506 is a decision step that determines whether the present read orientation and the present write orientation are the same, where these orientations are indicated by the flags ROTATE_RD and ROTATE_WT, respectively. In other words, the previous teachings have demonstrated that the preferred embodiment can read/write in two different orientations (e.g., horizontal and vertical). If these two orientations are different, then this will be depicted by different (e.g., complementary) states in the flags ROTATE_RD and ROTATE_WT; in this case, method 400 continues from step 506 to step 508. To the contrary, if these two orientations are the same, then this will be depicted by like states in the flags ROTATE_RD and ROTATE_WT; in this case, method 400 continues from step 506 to step 520. Each of these alternatives is discussed below.

Step 508, having been reached when the read and write orientations are different, determines whether a maximum number of words have been written in the present orientation. For example, earlier it is shown that in one embodiment when an overflow is detected, then four words are written vertically; applying this example to step 508, then the maximum is four, and this maximum is compared to the value of write pointer $PTR_{WT}$. Since that pointer is incremented for each write in method 400 (i.e., without the use of a separate offset), then if it exceeds the maximum, the overflow block is full; as such, method 400 illustrates the flow continuing to step 510, indicated as a strong overflow. To the contrary, if during step 508 write pointer $PTR_{WT}$ does not exceed the maximum, then method 400 illustrates the continuing to step 510, indicated as a weak overflow.

Steps 510 and 512 represent the opposite states of the overflow, as introduced above. Thus, step 510 is a strong overflow, meaning the overflow block is full. In this case, appropriate action may be taken. For example, an interrupt may be generated, yet system 10 also may be configured to establish a next write into another like-oriented block in another location in FIFO 12 that differs from the presently full overflow block. Conversely, step 512 indicates a weak overflow, meaning the present overflow block is not full and, hence, the next write also should be to that same block. In either event, following steps 510 and 512 is shown a step 514, which increments write pointer $PTR_{WT}$, thereby causing it to point to the next location of FIFO 12 into which a next word will be written (according to the appropriate one of orientation #1 or orientation #2).

Returning now to step 520, recall it is reached when the read and write orientations are the same. Next, step 520 determines whether write pointer $PTR_{WT}$ is currently pointing to the location immediately before the location currently indicated by read pointer $PTR_{RD}$. This determination may be made with the modulo expression shown in step 520, namely, whether $PTR_{WT}=PTR_{RD}-1$. Further, recall from earlier that in this case, a subsequent write will create an overflow. Thus, if the condition of step 520 is true, method 400 continues to step 522, whereas if the condition of step 522 is false, then method 400 continues to step 524.

In step 522, having been reached when a next write will cause an overflow, a rotate pointer ROTATE_PTR is established and is set equal to the current value of write pointer $PTR_{WT}$; note that this value of rotate pointer ROTATE_PTR will be used to identify the location of the next write. In addition, write pointer $PTR_{WT}$ is then zeroed. Finally, the state of ROTATE_WT is complemented. In other words, because the preceding step 520 has detected an upcoming overflow, then the orientation of the next write needs to be in an opposite direction as compared to the previous write. Thus, step 522 achieves this by changing ROTATE_WT to its complementary value. Following step 522, method 400 returns to step 404.

In step 524, having been reached when a next write will not cause an overflow, write pointer $PTR_{WT}$ is incremented. Following step 524, method 400 returns to step 404.

Having now described the write operations of method 400, attention is turned to its read operations as shown starting at step 600. Step 600 is a decision block that determines whether determines whether a flag identified as ROTATE_RD is true; like ROTATE_WT, this flag is also represented as a binary state such as a bit in a register, but here the step 600 flag pertains to reading. Thus, when an overflow has occurred and words have been written vertically into FIFO 12, as these words are incurred ROTATE_RD is set so that step 600 will direct them to be read appropriately. Thus, if ROTATE_RD is set, method 400 continues to step 602 in which case an orientation #2 read (e.g., vertical) is performed, whereas if ROTATE_RD is not set, method 400 continues to step 604 in which case an orientation #1 read (e.g., horizontal) is performed.

Following either step 602 or step 604, method 400 continues to step 606. Step 606 increments read pointer $PTR_{RD}$, thereby causing it to point to the next location of FIFO 12 from which a next word will be read (according to the appropriate one of orientation #1 or orientation #2). Following step 606, method 400 returns to step 404.

From the above, it may be appreciated that the above embodiments provide an improved overflow protected first-in first-out architecture, as may be implemented in various devices, particularly those using natural, raw data and where 100 percent precision is not required. The preferred embodiments reduce or eliminate the need to oversize the FIFO circuit of the device as is often implemented in the prior art so as to accommodate the relatively rare instance of FIFO overflow. Instead, the preferred embodiments permit a much smaller memory to be used, thereby having a positive impact on product size, power consumption, and cost. Note that the preferred embodiments may be applied to any technology but is preferably implemented with flip-flop based FIFOs where memory row/columns are accessible at the RTL stage. Moreover, while one sized FIFO (e.g., 16 words) has been described and with a specified bit size (e.g., 8 bits) and number of vertical words (e.g., 4 words) stored within an overflow block, each of these parameters may be adjusted to create numerous other embodiments. Further, while the preferred embodiment stores the overflow words across contiguous ones of the multiple word addresses, in an alternative embodiment the overflow words may be stored in some other manner, while still being stored in more than one horizontal word address, thereby only partially overwriting the horizontally-stored word while allowing re-capture of part or all of the overflow word. Thus, these examples provide yet another basis from which one skilled in the art may ascertain yet other variations, and indeed while the present embodiments have been described in detail, various substitutions, modifications or alterations could be made to the descriptions set forth above without departing from the inventive scope which is defined by the following claims.

The invention claimed is:

1. An electronic device, comprising:
   an input for receiving successive data words, wherein each data word of the successive data words comprises a plurality of bits;
   a memory structure comprising a plurality of memory word addresses, wherein each memory word address corresponds to a storage structure operable to store a data word having the plurality of bits;
   control circuitry, operable during a non-overflow condition of the memory structure, for writing successive ones of received data words into respective successive ones of the memory word addresses; and
   control circuitry, operable during an overflow condition of the memory structure, for writing each data word, in successive ones of received data words, across multiple ones of the memory word addresses.

2. The electronic device of claim 1 wherein the control circuitry, operable during an overflow condition of the memory structure, is for writing each data word in the successive ones of received data words across a same set of the multiple ones of the memory word addresses.

3. The electronic device of claim 2:
   wherein the plurality of bits consists of an integer number N of bits; and
   wherein N is selected from a group consisting of 128, 64, 32, 16, 8, and 4.

4. The electronic device of claim 1 wherein the control circuitry, operable during an overflow condition of the memory structure, is for writing each data word in the successive ones of received data words across a same set of multiple contiguously-addressed ones of the memory word addresses.

5. The electronic device of claim 1 and further comprising circuitry for detecting the overflow condition.

6. The electronic device of claim 5 wherein the circuitry for detecting the overflow condition is responsive to detecting a potential write of a data word into one of the memory word addresses, wherein the one memory word address already stores an unread data word.

7. The electronic device of claim 1 and further comprising circuitry for reading data words written during the non-overflow condition.

8. The electronic device of claim 7 and further comprising circuitry for reading data words written during the overflow condition.

9. The electronic device of claim 8 wherein the circuitry for reading data words written during the overflow condition comprises circuitry for reading each data word from multiple contiguously-addressed ones of the memory word addresses.

10. The electronic device of claim 1 wherein the memory structure, the control circuitry operable during a non-overflow condition of the memory structure, and the control circuitry operable during an overflow condition are all part of a handheld computing device.

11. The electronic device of claim 1 wherein the successive data words represent data selected from a group consisting of audio, screen trace, bit map, and uncompressed video data.

12. A method of operating an electronic device, the device comprising a memory structure comprising a plurality of memory word addresses, wherein each memory word address corresponds to a storage structure operable to store a data word having the plurality of bits, the method comprising:
   receiving, at an input, successive data words, wherein each data word of the successive data words comprises a plurality of bits;
   during a non-overflow condition of the memory structure, writing successive ones of received data words into respective successive ones of the memory word addresses; and
   during an overflow condition of the memory structure, writing each data word, in successive ones of received data words, across multiple ones of the memory word addresses.

13. The method of claim 12 wherein the writing step, during the overflow condition of the memory structure, comprises writing each data word in the successive ones of received data words across a same set of the multiple ones of the memory word addresses.

14. The method of claim 13:
   wherein the plurality of bits consists of an integer number N of bits; and
   wherein N is selected from a group consisting of 128, 64, 32, 16, 8, and 4.

15. The method of claim 12 wherein the writing step, operable during the overflow condition of the memory structure, comprises writing each data word in the successive ones of received data words across a same set of multiple contiguously-addressed ones of the memory word addresses.

16. The method of claim 12 and further comprising detecting the overflow condition by detecting a potential write of a data word into one of the memory word addresses, wherein the one memory word address already stores an unread data word.

17. The method of claim 12 and further comprising reading data words written during the non-overflow condition.

18. The method of claim 17 and further comprising reading data words written during the overflow condition.

19. The method of claim 18 wherein the step of reading data words written during the overflow condition comprises reading each data word from multiple contiguously-addressed ones of the memory word addresses.

20. The method of claim 12 wherein the successive data words represent data selected from a group consisting of audio, screen trace, bit map, and uncompressed video data.

* * * * *